United States Patent
Haber et al.

(10) Patent No.: US 8,370,821 B2
(45) Date of Patent: Feb. 5, 2013

(54) METHOD FOR ENABLING PROFILE-BASED CALL SITE TAILOR-ING USING PROFILE GATHERING OF CLONED FUNCTIONS

(75) Inventors: Gad Haber, Nesher (IL); Roy Levin, Haifa (IL); Shmuel Ur, Shorashim (IL)

(73) Assignee: International Business Machines Corporation, Armonk, NY (US)

( * ) Notice: Subject to any disclaimer, the term of this patent is extended or adjusted under 35 U.S.C. 154(b) by 1203 days.

(21) Appl. No.: 11/842,180

(22) Filed: Aug. 21, 2007

(65) Prior Publication Data
US 2009/0055813 A1 Feb. 26, 2009

(51) Int. Cl.
*G06F 9/45* (2006.01)

(52) U.S. Cl. ......... 717/151; 717/156; 717/157; 717/158

(58) Field of Classification Search ............ None
See application file for complete search history.

(56) References Cited

U.S. PATENT DOCUMENTS

| | | | | |
|---|---|---|---|---|
| 5,768,595 A * | 6/1998 | Gillies | | 717/156 |
| 5,812,855 A * | 9/1998 | Hiranandani et al. | | 717/157 |
| 5,857,105 A * | 1/1999 | Ayers et al. | | 717/144 |
| 5,920,721 A * | 7/1999 | Hunter et al. | | 717/159 |
| 5,966,539 A * | 10/1999 | Srivastava | | 717/156 |
| 6,161,217 A * | 12/2000 | Detlefs et al. | | 717/151 |
| 6,199,201 B1 * | 3/2001 | Lamping et al. | | 717/151 |
| 6,223,340 B1 * | 4/2001 | Detlefs | | 717/157 |
| 6,327,699 B1 * | 12/2001 | Larus et al. | | 717/158 |
| 6,745,384 B1 * | 6/2004 | Biggerstaff | | 717/156 |
| 6,895,580 B2 * | 5/2005 | Bates et al. | | 717/157 |
| 6,966,055 B2 * | 11/2005 | Haber et al. | | 717/151 |
| 7,032,217 B2 * | 4/2006 | Wu | | 717/158 |
| 7,036,116 B2 * | 4/2006 | Haber et al. | | 717/151 |
| 7,058,561 B1 * | 6/2006 | Kumar | | 703/22 |
| 7,100,155 B1 * | 8/2006 | Wu | | 717/158 |
| 7,120,906 B1 | 10/2006 | Stephenson et al. | | |
| 7,165,242 B2 | 1/2007 | Dmitriev | | |
| 7,207,038 B2 * | 4/2007 | Bicsak et al. | | 717/159 |
| 7,293,260 B1 * | 11/2007 | Dmitriev | | 717/158 |
| 7,330,962 B2 * | 2/2008 | Ludwig et al. | | 712/214 |
| 7,426,725 B2 * | 9/2008 | Moon et al. | | 717/157 |
| 7,805,710 B2 * | 9/2010 | North | | 717/151 |
| 8,141,064 B2 * | 3/2012 | Chipman | | 717/151 |
| 8,181,170 B2 * | 5/2012 | Patil et al. | | 717/151 |
| 2002/0032804 A1 | 3/2002 | Hunt | | |
| 2003/0154464 A1 * | 8/2003 | Ullmann et al. | | 717/158 |

(Continued)

OTHER PUBLICATIONS

Way et al., "Using Path-spectra-based Cloning in Region-based Optimization for Instruction-Level Parallelism", 14th International Conference on Parallel and Distributed Computing Systems, Richardson, Texas, 2001. [retrieved on May 9, 2011]. Retrieved from internet <URL:http://www.cis.udel.edu/~breech/publications/cs/WayEA-ISCA01.pdf>. pp. 1-8.*

(Continued)

*Primary Examiner* — Thuy Dao
*Assistant Examiner* — Xi D Chen
(74) *Attorney, Agent, or Firm* — Daniel Kligler

(57) ABSTRACT

Methods and systems for computer program optimization utilize function cloning in program code, such as post-linked code. Each function call is directed to a different cloned version of the called function. Conventional profiling methods such as hardware event sampling, basic block profiling, and edge profiling may then be applied to the modified program code to obtain call path-based, clone-specific profile data. The profile data can be further exploited to optimize the program code.

15 Claims, 7 Drawing Sheets

U.S. PATENT DOCUMENTS

| | | | |
|---|---|---|---|
| 2005/0138623 | A1 | 6/2005 | Fresko |
| 2005/0144606 | A1 | 6/2005 | Li et al. |
| 2010/0095287 | A1* | 4/2010 | Chipman ............... 717/157 |
| 2010/0325608 | A1* | 12/2010 | Radigan ............... 717/156 |
| 2011/0067018 | A1* | 3/2011 | Kawachiya et al. ........ 717/156 |
| 2011/0138373 | A1* | 6/2011 | Lane et al. ............... 717/157 |
| 2012/0096447 | A1* | 4/2012 | Inglis et al. ............... 717/158 |
| 2012/0198429 | A1* | 8/2012 | Chen et al. ............... 717/157 |

OTHER PUBLICATIONS

Keith Wansbrough, "A Methodology for Procedure Cloning", published online, May 24, 1995. [retrieved on May 9, 2011]. Retrieved from internet <URL:http:/citeseerx.ist.psu.edu/viewdoc/download-?doi=10.1.1.25.7565&rep=rep&type=pdf> pp. 1-6.*

Thomas P. Way, "Procedure Restructuring for Ambitious Optimization", a PhD dissertation, University of Delaware, Spring 2002. [retrieved on May 10, 2011]. Retrieved from internet <URL:http://citeseerx.ist.psu.edu/viewdoc/download?doi=10.1.1.27.3080&rep=rep1&type=pdf>. pp. 1-201.*

Glenn Ammons, James R. Larus, "Improving Data-flow Analysis with Path Profiles", 1998 ACM, [retrieved on May 10, 2011]. Retrieved from Internet <URL:http:/portal.acm.org/citation.cfm?id=277665>; pp. 72-84.*

Ammons et al., "Exploiting Hardware Performance Counters with Flow and Context Sensitive Profiling", 1997 ACM SIGPLAN Conference on Programming Language Design and Implementation. [retrieved on May 10, 2011]. Retrieved from Internet <URL:http:/citeseerx.st.psu.edu/viewdoc/download?doi=10.1.1.27.3080?rep=rep1&type=pdf>. pp. 1-12.*

Ayers, et al., "Aggressive Inlining", 1997 ACM, [retrieved on Oct. 3, 2011]; Retrieved from Internet <URL:http://dl.acm.org/citation.cfm?id=258928>; pp. 134-145.*

Hall, "Call Path Profiling", 1992 ACM, [retrieved on Sep. 30, 2011]; Retrieved from Internet <URL:http://dl.acm.org/citation.cfm?id=143147>; pp. 296-306.*

Cohn, Lowney, "Feedback directed optimization in Compaq's compilation tools for Alpha"; ACM, 1999. [retrieved on May 21, 2012]; Retrieved from Internet <URL:http://citeseerx.ist.psu.edu/viewdoc/download?doi=10.1.1.28.1643&rep=rep1&type=pdf>; pp. 1-10.*

Das, "Optimizing Subroutines with Optional Parameters in F90 via Funciton Cloning"; ACM, 2006. [retrieved on May 21, 2012]; Retrieved from Internet <URL:http://dl.acm.org/citation.cfm?id=1163573>; pp. 21-28.*

Bond, McKinley, "Probabilistic Calling Context", 2007 ACM; [retrieved on Sep. 24, 2012]; Retrieved from Internet <URL:http://dl.acm.org/citation.cfm?id=1297027>;pp. 97-111.*

Zhuang et al., "Accurate, Efficient, and Adaptive Calling Context Profiling", 2006 ACM; [retrieved on Sep. 24, 2012]; Retrieved from Internet <URL:http://dl.acm.org/citation.cfm?id=1133981>;pp. 263-271.*

Chakrabarti, Liu, "Inline Analysis: Beyond Selection Heuristics", 2006 IEEE; [retrieved on Sep. 24, 2012]; Retrieved from Internet <URL:http://ieeexplore.ieee.org/stamp/stamp.jsp?tp=&arnumber=1611543>;pp. 1-12.*

Chapman et al., "Dragon: An Open64-Based Interactive Program Analysis Tool for Large Applications", 2003 IEEE; [retrieved on Sep. 24, 2012]; Retrieved from Internet <URL:http://ieeexplore.ieee.org/stamp/stamp.jsp?tp=&arnumber=1236416>;pp. 792-796.*

Henis et al., "Feedback Based Post-Link Optimization for Large Subsystems," Second Workshop on Feedback Directed Optimization (Haifa, Israel, Nov. 1999), pp. 13-20.

Schmidt et al., "Profile-Directed Restructuring of Operating System Code," IBM Systems Journal 37:2 (1998), pp. 270-297.

Xiaotong Zhuang, et al., *Accurate, Efficient, and Adaptive Calling Context Profiling*, Proceedings of the 2006 ACM SIGPLAN Conference on Programming Language Design and Implementation.

\* cited by examiner

METHOD FOR ENABLING PROFILE-BASED CALL SITE TAILOR-ING USING PROFILE GATHERING OF CLONED FUNCTIONS

BACKGROUND OF THE INVENTION

1. Field of the Invention

This invention relates to optimization of computer code to achieve faster execution. More particularly, this invention relates to gathering of data about the frequencies with which different execution paths in a program are traversed.

2. Description of the Related Art

Profiling as a tool for optimization and restructuring is well known in the computer arts. Profile-based optimizations are widely used today in commercial compilers and post-link optimization tools. For example, post-link run time profiling is described by Henis et al., in "Feedback Based Post-Link Optimization for Large Subsystems," Second Workshop on Feedback Directed Optimization (Haifa, Israel, November, 1999), pages 13 20; and by Schmidt et al., in "Profile-Directed Restructuring of Operating System Code," IBM Systems Journal 37:2 (1998), pages 270 297.

Runtime profiling of a program creates a log recording usage statistics of each code block in two stages. First, in an instrumentation stage, each basic block or function is modified with either a new header or footer, wherein the added code increments a counter every time that basic block or function is run. In the second stage (the execution stage), the modified program is executed. At the end of the execution, the counters are written into a log file. Statistical analysis of the frequency of use of each basic block provides a method to rank the code blocks by importance. Code blocks that are frequently executed are called "hot" blocks, as opposed to rarely executed "cold" blocks.

Two general methods of obtaining profiling information are known, for example, from U.S. Pat. No. 7,120,906 to Stephenson et al. Sampling is the periodic measurement of a computer's register contents during execution of the program binary. The approach identifies where most of the time is spent during execution of a particular computer program. However, it is difficult to derive information about the source code or any of the series of intermediate representations that are produced during the compilation process.

A second method, known as instrumentation, is the insertion of extra instructions into the code during compilation in order to collect information at run time. There are disadvantages of such an invasive approach, e.g., increased code, prolonged execution time, and possibly altered program behavior. On the other hand, instrumentation is amenable to source code and intermediate representations of a program. Indeed, it is even proposed to dynamically add instrumentation code to a program while the target program is executing, as described in U.S. Pat. No. 7,165,242 to Dmitriev.

SUMMARY OF THE INVENTION

An embodiment of the invention provides a computer-implemented method of program code optimization, which is carried out by identifying a function in program code, in which call sites in the function have respective call paths leading thereto. The method is further carried out by cloning the function to create modified program code that has a plurality of instances of the function therein, assigning respective call paths to the instances of the function, executing the modified program code while accumulating respective clone-specific profile data for the instances of the function, and optimizing the modified program code responsively to the clone-specific profile data.

Other embodiments of the invention provide computer software product and apparatus for carrying out the above-described method.

BRIEF DESCRIPTION OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

Figure 1:
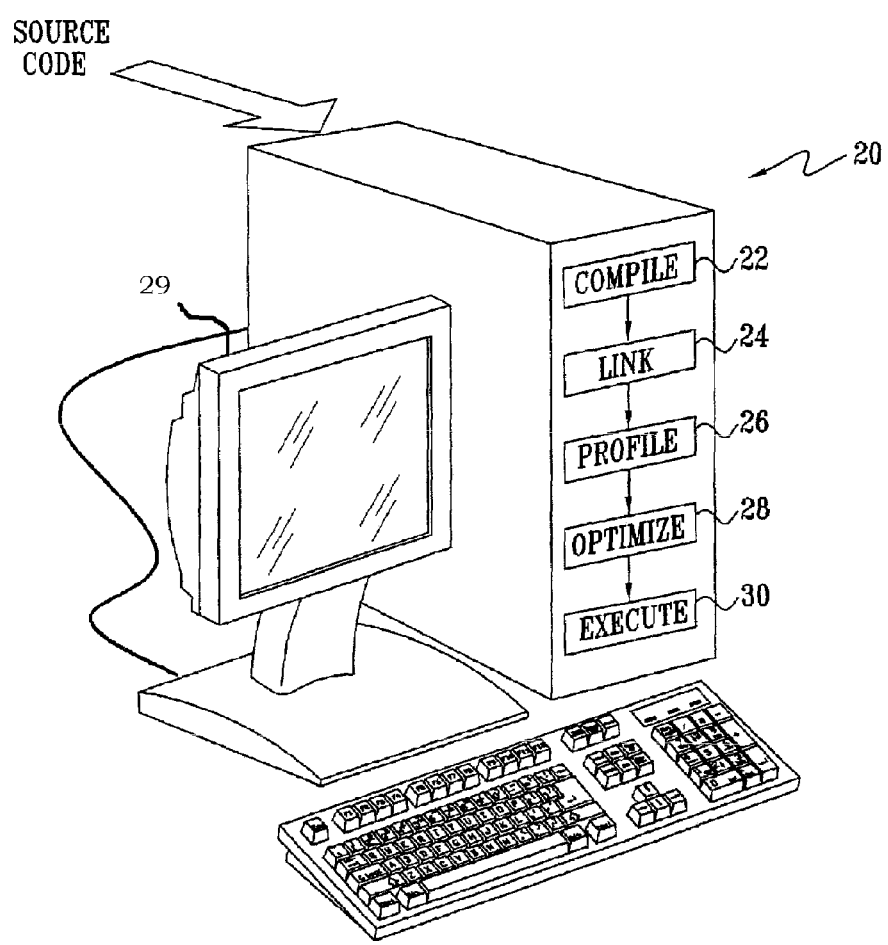
FIG. 1 is a block diagram that schematically illustrates a system for processing computer program code, in accordance with a disclosed embodiment of the invention.

In the following description, numerous specific details are set forth in order to provide a thorough understanding of the present invention. It will be apparent to one skilled in the art, however, that the present invention may be practiced without these specific details. In other instances, well-known circuits, control logic, and the details of computer program instructions for conventional algorithms and processes have not been shown in detail in order not to obscure the present invention unnecessarily.

Software programming code, which embodies aspects of the present invention, is typically maintained in permanent storage, such as a computer readable medium. In a client/server environment, such software programming code may be stored on a client or a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems.

Overview.

Calling context optimizations usually rely on appropriate profiling data in order to avoid code bloat. A calling context is defined as a chain of function calls that are concurrently active on the stack. A function foo may have a different behavior when called from different calling sites. The calling context can be determined by walking the call stack backward from the top to the root of the stack, recording each method on the stack along the way. Methods for gathering calling path information often require computationally intense profiling methods such as extended path profiling, calling context trees or sampled stack-walking. The term stack walking refers to inspection of the call stack by the profiler at sampling points, in which the stack is examined from the top of the stack to the root of the stack in order to characterize the full calling context at that sampling point. Typically, stack-walking is followed by a short period, called a burst, during which the profiler traces each and every method call and return.

Calling context profiling is described in the document Accurate, Efficient, and Adaptive Calling Context Profiling, Xiaotong Zhuang, et al., In Proceedings of the 2006 ACM SIGPLAN Conference on Programming Language Design and Implementation. Simpler profiling methods such as basic block profiling or edge profiling are generally unsuitable for gathering the needed call-path-based information, as they are context unaware.

The above-noted methods cannot conveniently relate hardware event profiling to the calling path, e.g., cache misses, cycle ticks, pipeline stalls, TLB (translation lookaside buffer) misses, IPC (instructions executed per cycle), and any other hardware or user-requested event that is profiled via sampling. For example, they cannot provide the optimizer the ability to relate a cache miss, that occurs in some function 'foo', to the specific calling site from which the function 'foo' was called and which caused the event to occur.

According to aspects of the invention, functions of interest are cloned. Techniques for cloning program code are known, for example from U.S. Patent Application Publication No. 2005/0144606 by Li at al. Cloning of program code refers to creating various versions of the code, e.g., in the form of a function, to optimize the function's performance. By cloning a function, we can "specialize" it for a specific calling site. This can be done based on the parameters that are passed to the function. For example, if the function is always called with a certain constant value, then we can completely omit the parameter and apply Constant Propagation and Dead Code Elimination optimizations to remove any code that relates to the omitted parameter. As a result, various conditions within the cloned function, which are known to be always false (or true), are removed by dead code elimination. Finally, due to the code changes done to the cloned function, other optimizations e.g., register allocation, instruction scheduling, code reordering, can be applied to further improve performance Generally, one or more versions of a function are cloned from the function, and configured so that each cloned version performs better when the cloned function is invoked instead of the original function. Calls to cloned functions having different call paths are directed to different cloned versions of the called function. Thus, the program executes a more appropriate or optimized version of the function.

For example, cloning may be done based on the relationship between two or more parameters of a function, the values of one or more parameters, or opportunistically in order to allow a compiler to maximize its ability, e.g., freely to allocate resources at its own choice.

Conventional profiling methods, e.g., hardware event sampling, basic block profiling, edge profiling, are applied to obtain call path-based profiling information. Call site tailoring is then performed, using the profile information. Call site tailoring is a generic term for optimizations that are performed on a function call basis, such as function in-lining and cloning.

Aggressive use of cloning for the purpose of profile gathering has a number of advantages over conventional profiling techniques:

1. When used in conjunction with accurate profiling methods that use program instrumentation, the overhead of cloning is very small. This is due in part to the fact that it is not required to check the calling stack of each thread in order to determine the calling function of each executed instruction.

2. For less accurate profiling methods that are based on sampling a running program, the cloning approach is still very efficient, as it avoids the overhead of stack walking at each sampled event or instruction.

3. It is relatively easy to collect calling context hardware events, e.g., the hardware events listed above, and attach them to the calling function.

The technique according to the invention can be readily adapted to existing instrumentation tools by those skilled in the art. It is very suitable for post-link monitoring and optimization tools.

System Architecture

Turning now to the drawings, reference is initially made to FIG. 1, which is a block diagram that schematically illustrates a system 20 for processing computer program code, in accordance with a disclosed embodiment of the invention. The system 20 typically comprises a general purpose or embedded computer processor, which is programmed with suitable software for carrying out the functions described hereinbelow. Thus, although portions of the system 20 are shown as comprising a number of separate functional blocks, these blocks are not necessarily separate physical entities, but rather represent different computing tasks or data objects stored in a memory that is accessible to the processor. These tasks may be carried out in software running on a single processor, or on multiple processors. The software may be provided to the processor or processors on tangible media, such as CD-ROM or non-volatile memory. Alternatively or additionally, the system 20 may comprise a digital signal processor or hard-wired logic.

The system 20 may receive source code that is prepared by a programmer. A compiler 22 compiles the source code to generate object code, and a linker 24 links the compiled code with library code, as is known in the art. The linked code is fed to a profiler 26, which obtains run-time information about the frequency of use of each block of object code in the linked code by running the linked code on a representative input. The profile information along with the original linked code is fed to an optimizer 28, which labels often-run blocks or functions as "hot" and seldom-run blocks or functions as "cold," and then analyzes and modifies the code, as described in detail hereinbelow. Alternatively, a compiler can process the profile information by mapping the profile information back to the internal representation of the program that is generated by the compiler for feedback optimizations. In either case, the optimized code can then be executed by a run-time module 30, as is likewise known in the art. Although all of functions are shown for simplicity as being performed in the system 20, it will be appreciated that these functions may also be separated and carried out on different computers. Thus, the optimizer 28, which is an element of particular concern to the present invention, may receive profiled or unprofiled post-link code from another source, outside the system 20, and may pass the optimized code to yet another computer for execution.

The optimizer 28 may be implemented as FDPR-Pro, a post link optimizer available from IBM Corporation, 1 New Orchard Road, Armonk, N.Y. 10504-1722. FDPR is also described in the document "FDPR—A Post-Pass Object Code Optimization Tool", I. Nahshon and D. Bernstein., Proc. Poster Session of the International Conference on Compiler Construction, pp. 97-104, April 1996, which is herein incorporated by reference. Modifications to FDPR to accommodate the technique disclosed below can be readily accomplished by application of ordinary skill in the art.

After execution and collection of profile data, profile results can be assembled for presentation on a display 29, as described in further detail below.

Operation

Figure 2:
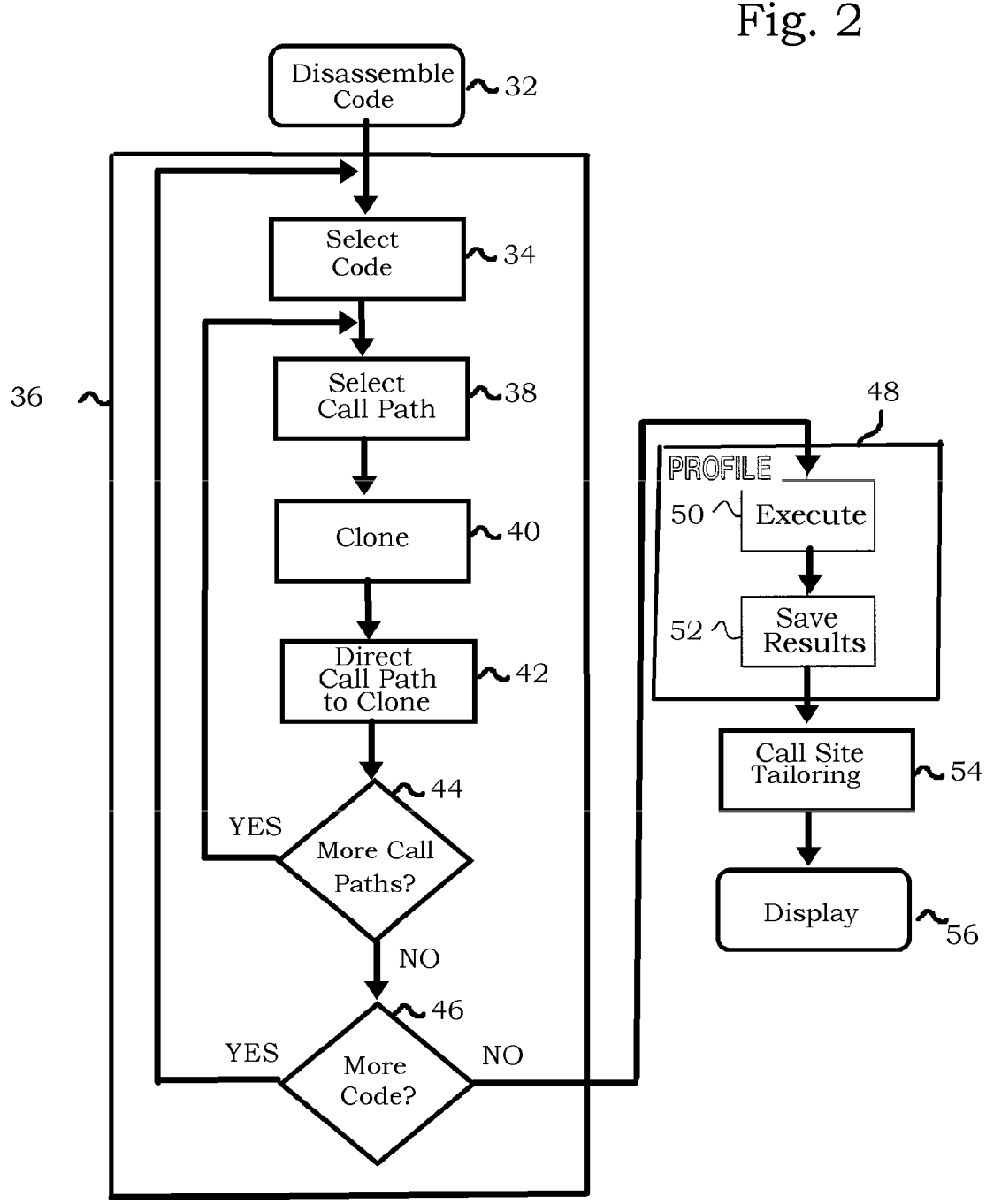
FIG. 2 is a high-level flow chart of a method for gathering profile information from computer program code in accordance with a disclosed embodiment of the invention.

Reference is now made to FIG. 2, which is a high-level flow chart of a method for gathering profile information from computer program code in accordance with a disclosed embodiment of the invention. At initial step 32, code is marked. In one embodiment, this is accomplished by disassembly of post-linked code, in order to identify the instructions in the code. Any suitable method known in the art can be used for this purpose. Suitable methods are disclosed in commonly assigned U.S. Pat. Nos. 6,966,055 and 7,017,054, both issued to Haber et al., which are herein incorporated by reference. For example, an incremental disassembly method may be used to dissect the code into its basic blocks. For this purpose, addresses of instructions within the executable code are extracted from a variety of sources, in order to form a list of "potential entry points." The sources typically include program/DLL entry points, a symbol table (for functions and labels), and relocation tables (through which pointers to the code can be accessed).

At the end of the incremental disassembly process, the entire code section of the original program is dissected into basic blocks, which are either classified or unclassified. The classified blocks are marked with flags, which characterize them as either code or data (such as branch table data), and which identify the control flow properties of the code blocks, e.g., Fallthrough, Continue, Call, Return, Jump. Call and Return flags, inter alia, are used to identify functions and function calls in the code.

Alternatively, initial step 32 may be omitted when an optimizing compiler is employed. In this case, the procedure begins at step 34, described below. The compiler marks the blocks and functions according to directives in source code. Such markings facilitate extraction of code semantics from post-link code. For example, a compiler may mark problematic code areas and data areas in the code adding special comments and entries in the symbol table of the object file and special relocation information in the relocation table. Problematic code areas are usually targets of branches via registers Problematic data areas includes branch tables containing addresses of code targets that are used at run-time, data areas embedded in the code, and location of data variables. Indeed, instrumentation code, as described below, may also be inserted by the compiler. However, this approach has a disadvantage, as the compiler may be restricted by linkage conventions.

Optimizer 28 (FIG. 1) now performs further analysis in block 36. At step 34, program code is selected. The selected code is typically a function identified in initial step 32.

Next, at step 38 a call path to the currently selected code is identified. This can be accomplished automatically using known compilers or post-link optimization tools.

Next, at step 40 a clone of the current code being evaluated, e.g., a function, is introduced into the post-linked code. The currently selected call path is directed to the clone at step 42. As noted above, a compiler can be used to clone the function, in which case the disassembly required by post-link tools can be avoided.

Control now proceeds to decision step 44, where it is determined if there are more call paths leading to the currently selected code. If the determination at decision step 44 is affirmative, then control returns to step 38 to iterate the cloning process.

If the determination at decision step 44 is negative, then cloning of the currently selected code has been completed. Control now proceeds to decision step 46, where it is determined if more code remains to be processed. If the determination at decision step 46 is affirmative, then control returns to step 34.

If the determination at decision step 46 is negative, then control exits block 36 and proceeds to block 48, where profiling is conducted in step 50, now including the cloned blocks or functions. Clone-specific results are saved in step 52. Steps 50, 52 may be performed using any convenient profiling method.

Upon completion of step 42, control exits block 36 and proceeds to step 54. Here a specific calling-contextual analysis of the cloned profiled code is conducted, and call-site tailoring of the code is performed on a call basis, e.g., a function call basis, using the clone-specific profiling data at each call site. Additionally or alternatively, code may be realigned to reduce the number of instruction cache misses, TLB misses, page faults, branch penalty, and to improve branch prediction. The ability to relate hardware events to the calling context is one advantage of the approach taken according to aspects of the invention, and results in superior optimization.

The procedure terminates at final step 56, Clone-specific profile results may be displayed at this time.

Cloning Procedures

Call graphs are a commonly used, succinct representation of method invocation behavior, in which nodes representing methods are connected by directed edges representing caller-callee relationships. By themselves, call graphs do not provide sufficient calling context information. For example, the causes of hardware events may not be evident from a mere identification of a function in which the event occurs. Rather calling context information may also be required to fully characterize the environment in which such events occur. Nevertheless, call graphs are useful in carrying out the present invention.

Figure 3:
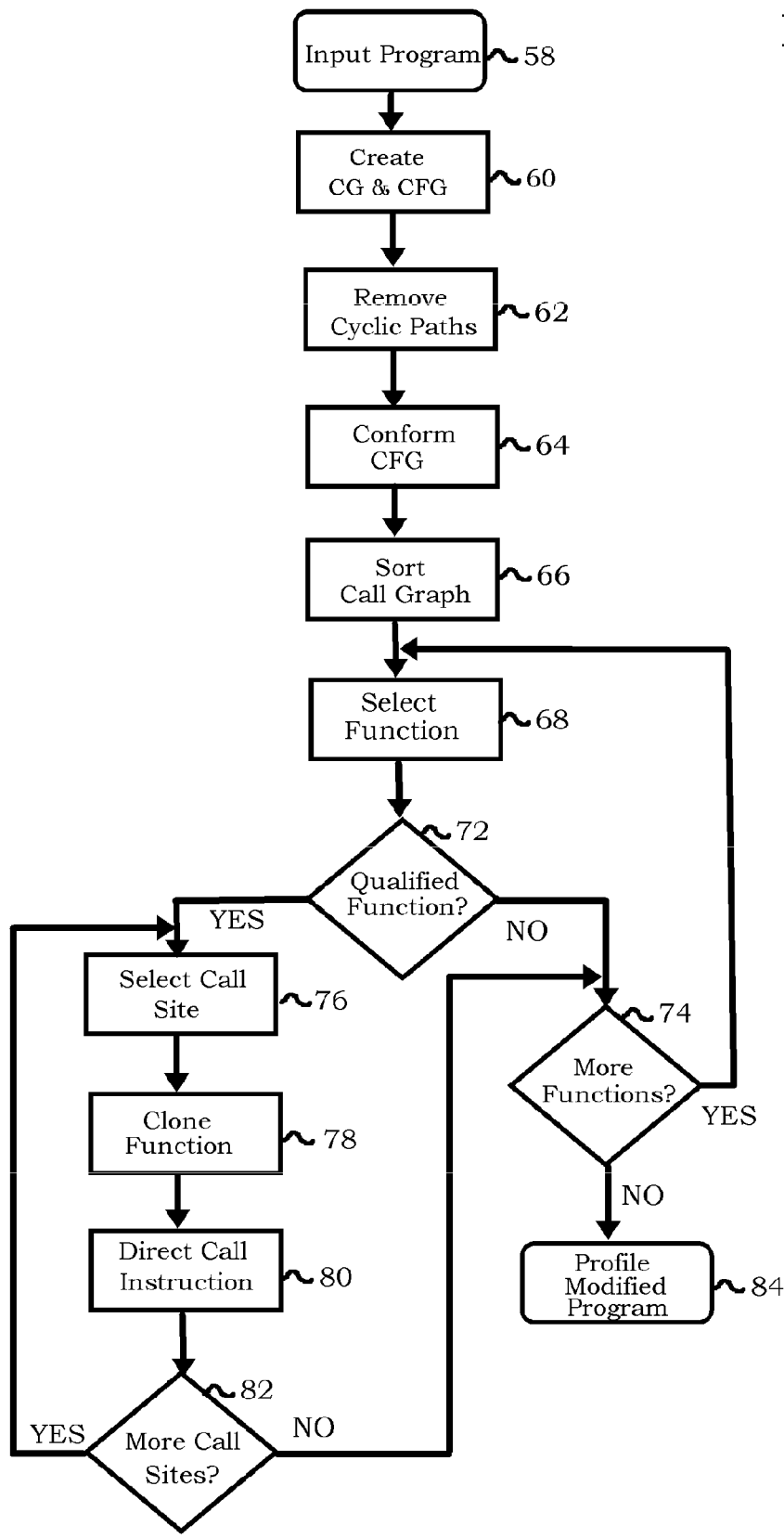
FIG. 3 is a detailed flow chart illustrating function cloning in the method shown in FIG. 2, in accordance with a disclosed embodiment of the invention.

Reference is now made to FIG. 3, which is a detailed flow chart illustrating a method of function cloning that is implemented in block 36 (FIG. 2), in accordance with a disclosed embodiment of the invention. The process steps are shown in a particular linear sequence for clarity of presentation. However, it will be evident that many of them can be performed in parallel, asynchronously, or in different orders.

At initial step 58 a program P is selected and processed as described in initial step 32.

Next, at step 60, a call graph G and a control flow graph CG are prepared for the program P. Then, at step 62, the call graph G is inspected, and all cyclic paths removed. Cyclic paths reflect recursive calls in the program. In order to deal with such calls, it is necessary to remove one of the edges in each cycle. The procedures for cyclic path removal are described below.

Next, at step 64, the control flow graph CG is conformed to the modified call graph G prepared in step 60 as follows: Prepare an extended control flow graph EG that contains the control flow graph of each function and the directed edges for call and return instructions. The extended control flow graph EG is generally too large to be kept as a whole in memory. It is rather a temporary intermediate data structure used for calculating the control flow graph CG. The control flow graph CG is then saved, while the extended control flow graph EG can be discarded. The procedure continues: for each function f in the call graph EG that is a candidate for inlining:

(a) For every two incoming edges e1 and e2 to the function f in CG, let caller1 be the caller basic block ending with edge e1 and let caller2 be the caller basic block ending with edge e2 in the extended control flow graph EG. Let fallthru1 and fallthru2 be the basic blocks following caller1 and caller2 in EG respectively;

(b) traverse the extended control flow graph EG and search for directed paths from fallthru1 to caller2 and from fallthru2 to caller1; and (c) if both paths exist, remove the edges e1 and e2 from EG.

Next, at step 66 the call graph G is sorted topologically.

Figure 4:
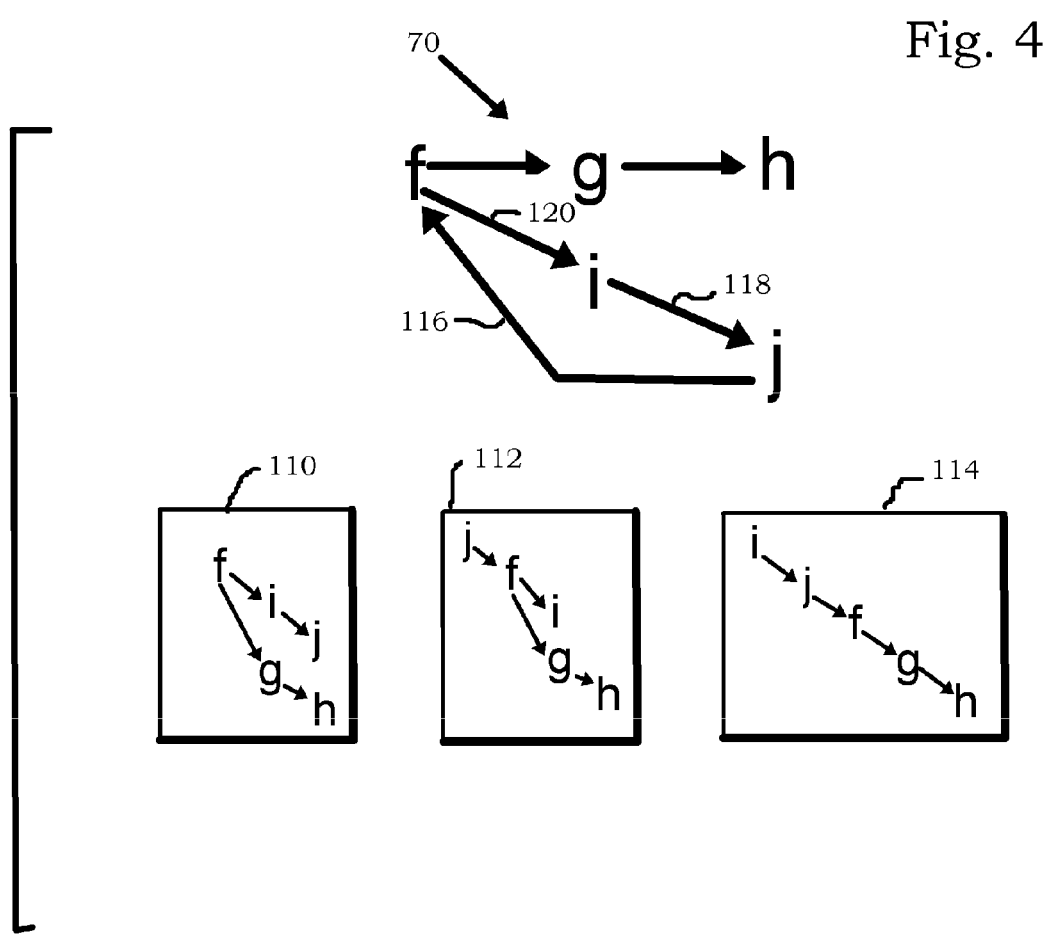
FIG. 4 is a diagram including a fragment of a call graph illustrating effects of removing edges for rearrangement of the graph in accordance with a disclosed embodiment of the invention.

Next, step 68 begins a sequence in which all the functions in the call graph G are evaluated in descending topological order, beginning with functions in the roots. A function f is selected. Reference is now made to FIG. 4, which is a fragment of a call graph 70 in which a cloning procedure is carried out in descending topological order, according to a disclosed embodiment of the invention. The cloning algorithm starts from the roots, which in this case are functions h and j, and starts cloning them by progressing towards the leaf function f, which is left uncloned. FIG. 4 is described in further detail below.

Control now proceeds to decision step 72, where it is determined if the current function is qualified to be cloned, i.e., it meets predetermined criteria. Typically, the criteria are that the function f is smaller than some threshold size. The purpose of this is to limit code bloat in the modified version of the program P, which is referred to as program P'. If the determination at decision step 72 is negative, then the current function is not processed. Instead, control proceeds directly to decision step 74, which is described below.

Additionally or alternatively, qualifications for cloning can be established arbitrarily by the operator. For example, it may be desirable to evaluate classes of call sites rather than call sites individually. Thus, a clone accepting calls by one or more error handlers could be separated from clones accepting calls from other functions representing normal operation of a program. Groupings of such clones can be made in many combinations.

If the determination at decision step 72 is affirmative, then control proceeds to step 76. A call site having an outgoing edge in the call graph G leading to the current function f is selected.

Next, at step 78 a clone of the current function, referenced as function f_dup_n, where n represents a particular clone of the function f, is generated and, in embodiments employing a post-link tool, inserted into the post-link code. Alternatively, in embodiments employing a compiler, the clone is added to the control flow graph representation. It should be noted that all relevant information needed to execute the function f_dup_n, e.g., symbolic information, branch tables, traceback data, are duplicated in step 78. A duplicate control flow graph representation is also maintained for each function f_dup_n.

At step 80 The call site selected in step 76 is adjusted to direct program control to the current version of the function f_dup_n.

Control now proceeds to decision step 82, where it is determined if more call sites need to be processed for the current function f. If the determination at decision step 82 is affirmative, then control returns to step 76.

Decision step 74 is performed if the determination at decision step 82 or decision step 72 is negative. It is determined if more functions remain to be processed in the call graph G.

If the determination at decision step 74 is affirmative, then control returns to step 68 for selection of a new function.

If the determination at decision step 74 is negative, then control proceeds to final step 84. The program P' is run and appropriate profiling information is collected. This can be done by any suitable profiling method. For example, instrumentation stubs can be used, or an external monitoring utility can be executed. Such utilities are well known in the art. The program Oprofile, available from Sourceforge.net, and the AIX® CPU profiling tool tprof are suitable for Linux and Unix systems, respectively.

Display of Profile Results

After performance of the profiling steps in final step 84, results can be displayed for the operator. Clones may have been created earlier in decision step 72 as a result of predefined criteria. Even after profiling, however, a module in the optimizer is capable of aggregating or rearranging clone-specific profile data so that the operator can establish classes of clones to be compared against other classes by display of class results.

EXAMPLE

Four clones may be generated for a function f, and separated according to call sites as described above. Profiling in final step 84 yields exemplary results, as shown in Table 1, in which the number of clone-specific calls are shown.

Clones 1 and 2 represent calls to the function f occurring in normal program operation. Clones 3 and 4 represent calls occurring under abnormal circumstances, e.g., some error condition. It may be helpful to aggregate normal and abnormal profile data by aggregating the four clones to form two classes, and then combining clone-specific profile data of the classes. Classes 1 and 2 aggregate results of normal and abnormal calls to the function f, respectively. The combined data are then displayed as class results. This can be done even if criteria for clone generation were not tailored to create these classes prior to performing decision step 72. The effect is seen from an inspection of Table 1 and Table 2.

TABLE 1

| Clone 1 | Clone 2 | Clone 3 | Clone 4 |
|---------|---------|---------|---------|
| 50      | 75      | 50      | 100     |

TABLE 2

| Class 1 (Clones 1 & 2) | Class 2 (clones 3 & 4) |
|------------------------|------------------------|
| 125                    | 150                    |

Figure 5:
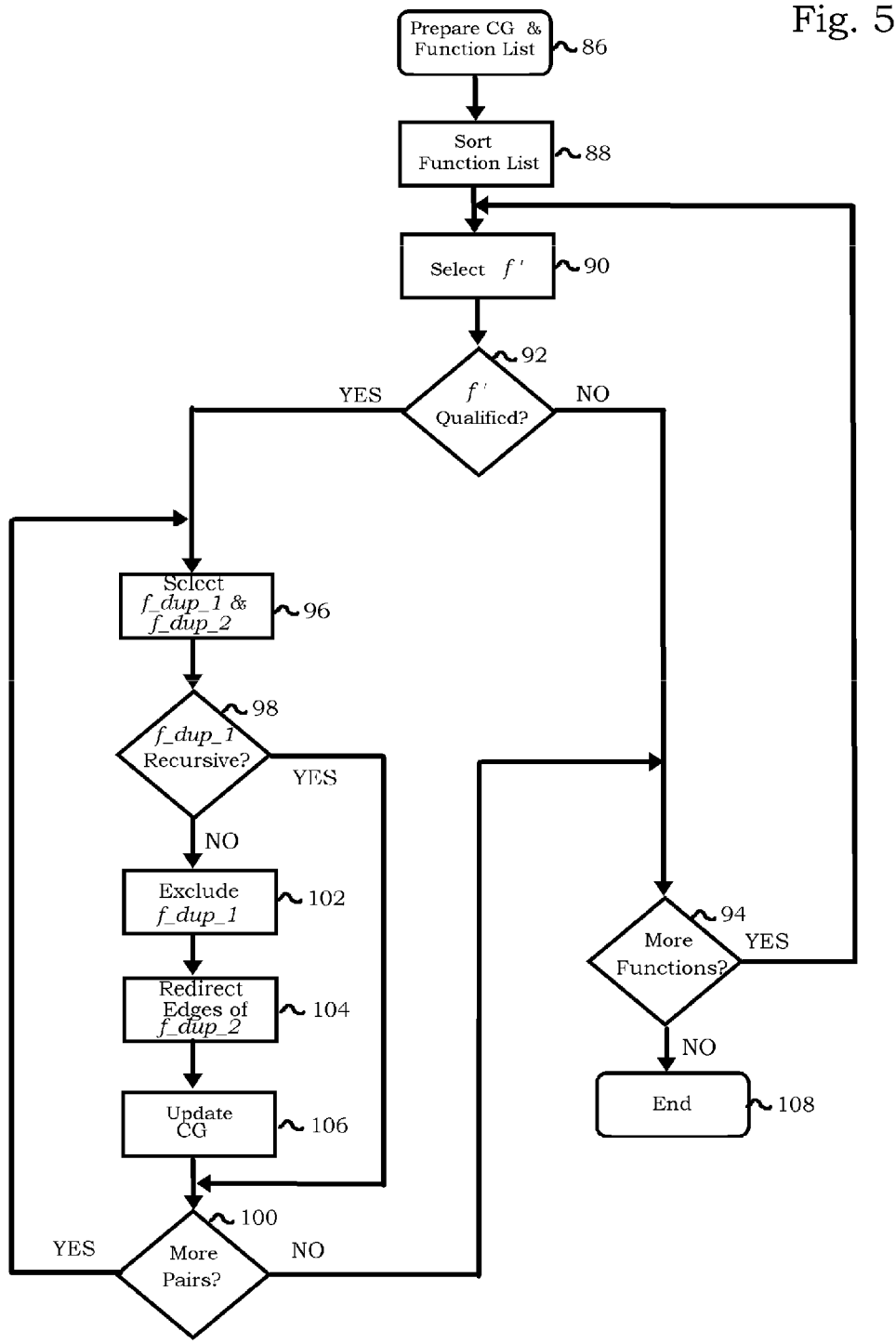
FIG. 5 is a flow chart of a method of evaluating a collection of profiled data from modified programs having cloned functions therein, in accordance with a disclosed embodiment of the invention.

Reference is now made to FIG. 5, which is a flow chart of a method of evaluating a collection of profiled data from modified programs having cloned functions therein, in accordance with a disclosed embodiment of the invention. The method is described with reference to the program P', which is assumed to have been generated as described above, and profile data collected by performing final step 84 (FIG. 3).

At initial step 86 a call graph G' and a list of cloned functions are prepared for the modified program P'. Each cloned function is given a header in its name to distinguish the clones. Using the collected profiling data, a weight is assigned to each edge in the call graph G', representing the frequency or estimated frequency of each function call according to the profile information.

Next, at step 88, the list is sorted according to the topological order of the functions in the call graph G.

Step 90 begins a sequence in which all the functions in the list that was prepared in initial step 86 are evaluated in ascending topological order, beginning with functions in the leaves. A cloned function f' is selected from the list.

Control now proceeds to decision step 92, where it is determined if the function f' meets criteria for consolidation of its clones. When clones are found to behave similarly, there is no need to maintain them separately in production code. This is the case when the call paths of the clones have the same topological value and degree of profile overlap that exceeds a predetermined threshold. A degree of profile overlap in the range of 80% or higher is usually a good indication that both duplicates have a similar "behavior" and can be merged back to a single copy (if they do not include other differences, such as different parameter values). The topological value of a clone, which is a node on a call graph, is the longest path of edges starting from the leaf nodes that have no incoming edges and ending at the node. Profile overlap is a metric is used to compare the behavior of one calling context tree (CCT) with respect to another. Its definition is given in the above-noted document by Xiaotong Zhuang, et al. as follows:

$$overlap(CCT_1, CCT_2) = \sum \min(pweight(e, CCT_1), pweight(e, CCT_2)) e \in CCT_1 \cap CCT_2,$$

where $pweight(e, CCT_n)$ is defined as the percentage of a CCT's total edge weights represented by the edge weight on e. Only edges on both $CCT_1$ and $CCT_2$ are counted. The degree of overlap indicates how CCT2 overlaps with $CCT_1$ or how $CCT_2$ is covered by $CCT_1$. The degree of overlap ranges from 0% to 100%.

If the determination at decision step 92 is negative, then the current function f' is not processed, and control proceeds to decision step 94, which is described below.

If the determination at decision step 92 is affirmative, then control proceeds to step 96. A pairwise selection of two duplicates f_dup_1, f_dup_2 of the current function f' is made. In the case in which only one clone exists, the original version of the function f' is used as one of the two duplicates. Members of the resulting 2-tuple may be reused in subsequent iterations of step 96.

Control now proceeds to decision step 98, where it is determined if one of the clones, e.g., f_dup_1, has a recursive call to a different clone of the current function f'. If the determination at decision step 98 is affirmative, then the current pair is not processed. Control proceeds directly to decision step 100, which is described below.

If the determination at decision step 98 is negative, then control proceeds to step 102. Here the clone, e.g., f_dup_1, is excluded from the call graph G' and also from the program P'. All the incoming edges leading to the clone f_dup_1 are redirected to the clone f_dup_2 in step 104.

Next, at step 106 the weights of the edges in the call graph G' (and in the control flow graph CG) of the remaining clone f_dup_2 are updated to reflect the changes resulting from removing the clone f_dup_1.

Control now proceeds to decision step 100, where it is determined if more duplicates of the current function f' remain to be evaluated. If the determination at decision step 100 is affirmative, then control returns to step 96.

If the determination at decision step 100 is negative, then control proceeds to decision step 94, where it is determined if more functions in the program P' remain to be processed.

If the determination at decision step 94 is affirmative, then control returns to step 90 to choose a new function.

If the determination at decision step 94 is negative, then control proceeds to final step 108. At this point, clones having differing behavior remain in the program code. These clones can now be optimized further conventionally.

Removal of Cyclic Paths

Preparation of the call graph G (step 62, FIG. 3) requires removal of cyclic paths in order for the cloning algorithm to handle recursive function calls that are reflected by cyclic paths in the call graph. In order to handle cyclic paths, the algorithm requires removal of one of the edges in the cycle. Reference is again made to FIG. 4, which illustrates effects of removing edges for rearrangement of the graph, in accordance with a disclosed embodiment of the invention. Different inlining orders are created when different edges are removed from a graph. In the call graph 70 there is a cycle, in which function f includes a call to function i that in turn calls to another function j, which in turn calls function f to form a cyclic path.

Different inlining chains may be created by removing different edges in the call graph 70, as shown in the directed acyclic graph representations in blocks 110, 112, 114 according to the following rules: if some function foo contains an inlined calling site to some function bar, then bar will be drawn beneath foo and slightly aligned to the right. If for some reason, bar is drawn directly beneath function foo, without being aligned to the right, then this would mean that both foo and bar were inlined into some other function gal containing the two calling sites to foo and bar. FIG. 4 shows all possible inlining chains created by removing different edges in the f-i-j cycle.

For example, as shown in block 110, removing j-f edge 116, will cause function j to be inlined into function i, which in turn is inlined into function f. Block 112 illustrates the effect of removing i-j edge 118. Block 114 illustrates the effect of removing f-i edge 120.

When profiling weights for the edges are unavailable, the directed acyclic graph having the largest number of edges is generally preferred among the blocks 110, 112, 114. In this example, the directed acyclic graphs in blocks 110, 112, 114 each have four edges, and therefore have the same rank in the directed acyclic graph representation.

When frequency weights are available for the edges, the preferred option is the one in which the "coldest" edge is deleted in order to "break" the cycle. For example if the edge 116 (j,f) was never executed during profiling (i.e., has a weight of zero) and other edges have a weight larger than zero, then block 110 becomes the best option, as it breaks the cycle by avoiding duplicating the "cold" function call to the function f, which would not affect performance anyway.

Each directed acyclic graph is ranked according to the sum of weights on all its edges. The higher the sum, the better the ranking.

Because selection of one of the edges produces differing inlining effects, it is important to search for the maximal directed acyclic graph representation of the call graph G (FIG. 3). This problem is a variation of the feedback edge set problem, which is discussed in the document A Fast and Effective Heuristic for the Feedback Arc Set Problem, P. Eades, X. Lin, and W. F. Smyth. Info. Proc. Letters, 47:319-323, 1993, which is herein incorporated by reference. The problem is NP-hard and the time complexity of the algorithm is exponential with respect to the number of edges in the largest strongly connected component of G. However, since in practice, the number of recursive functions, which participate in the creation of cycles in a call graph is usually very small, the time complexity is sufficiently small. The algorithm presented in the Eades document may be used to determine which edge in a cycle to remove. For convenience, a pseudocode representation of this algorithm is reproduced from the Eades document in Listing 1.

Listing 1

```
procedure GR (G : DiGraph; var s : VertexSequence);
  s₁ ← ∅; s₂ ← ∅;
  while G ≠ ∅ do
    {while G contains a sink do
       {choose a sink u; s₂ ← us₂; G ← G − u};
     while G contains a source do
       {choose a source u; s₁ ← s₁u; G ← G − u};
     choose a vertex u for which δ(u) is a maximum;
     s₁ ← s₁u; G ← G − u};
  s ← s₁s₂.
```

Alternate Embodiment 1

Figure 6:
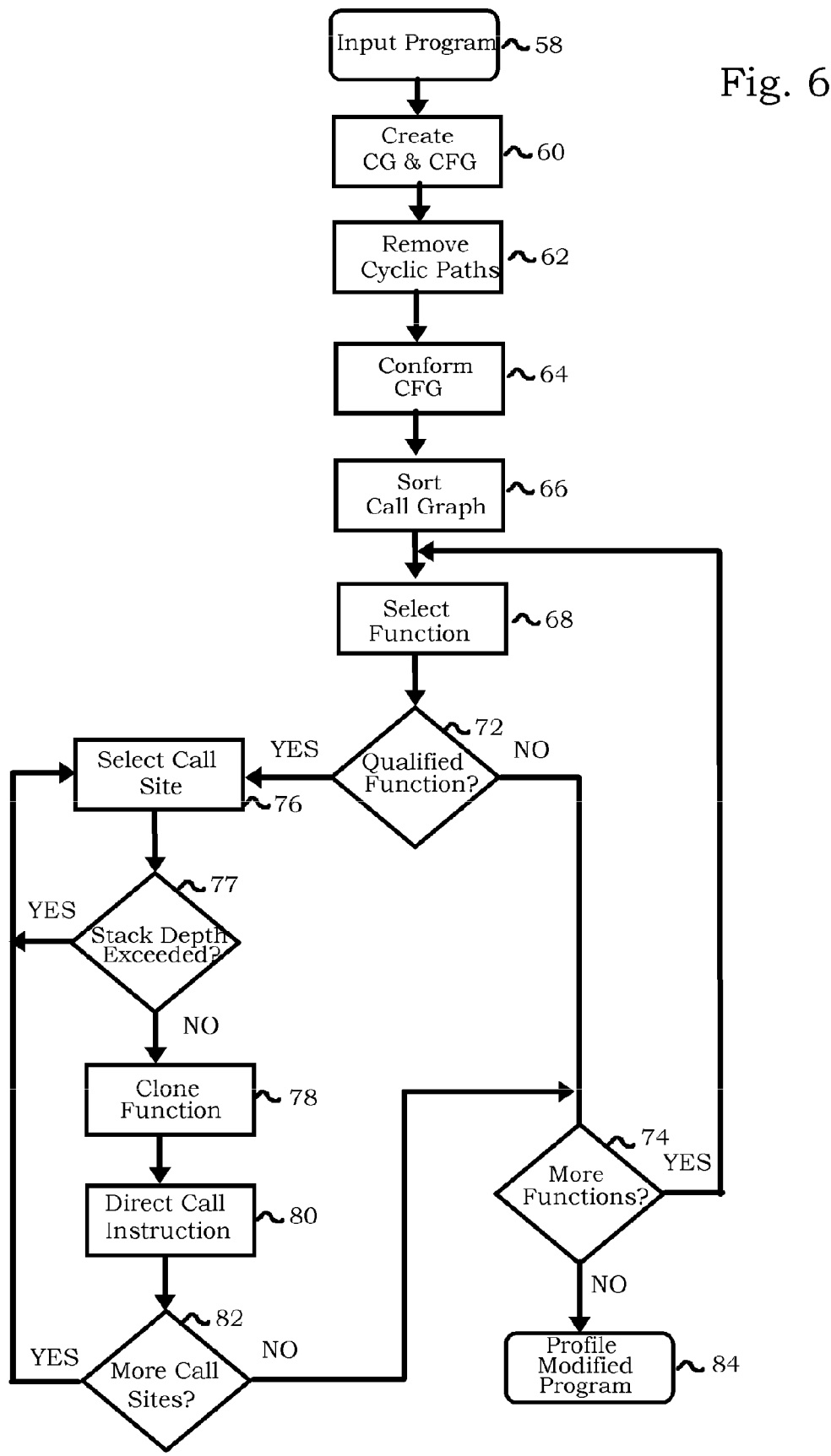
FIG. 6 is a high-level flow chart of a method for gathering profile information from computer program code in accordance with an alternate embodiment of the invention.

Reference is now made to FIG. 6, which is a high-level flow chart of a method for gathering profile information from computer program code in accordance with an alternate embodiment of the invention. This embodiment has many steps in common with the embodiment of FIG. 2, which are not repeated. However cloning now is limited by call stack depth, a value determined by the number of functions currently invoked. In this embodiment, after selection of a call site in step 76, control proceeds to decision step 77, where it is determined if the call stack depth relating to the current call site exceeds a predetermined level. If the determination at decision step 77 is affirmative, then control returns to step 76 for selection of a different call site.

If the determination at decision step 77 is negative, then control proceeds to step 78 in which the function is cloned as in the embodiment of FIG. 2.

The advantage of this embodiment is that fewer replicas are incorporated in the code of the program P', resulting in a smaller code size.

Alternate Embodiment 2

Many programs are very large, or contain code that is rarely executed. In order to expedite gathering of meaningful profiling information, preliminary profiling is carried out in order to identify blocks or functions that meet predefined criteria. Generally, the criteria relate to activity of the blocks or functions. Qualifying code is subjected to further analysis and cloning according to the invention, as described below. Code that fails to qualify may be ignored. Qualifying code may mean hot code, implying that cloning is usually restricted to hot code in this embodiment. However, other criteria could be applied.

Figure 7:
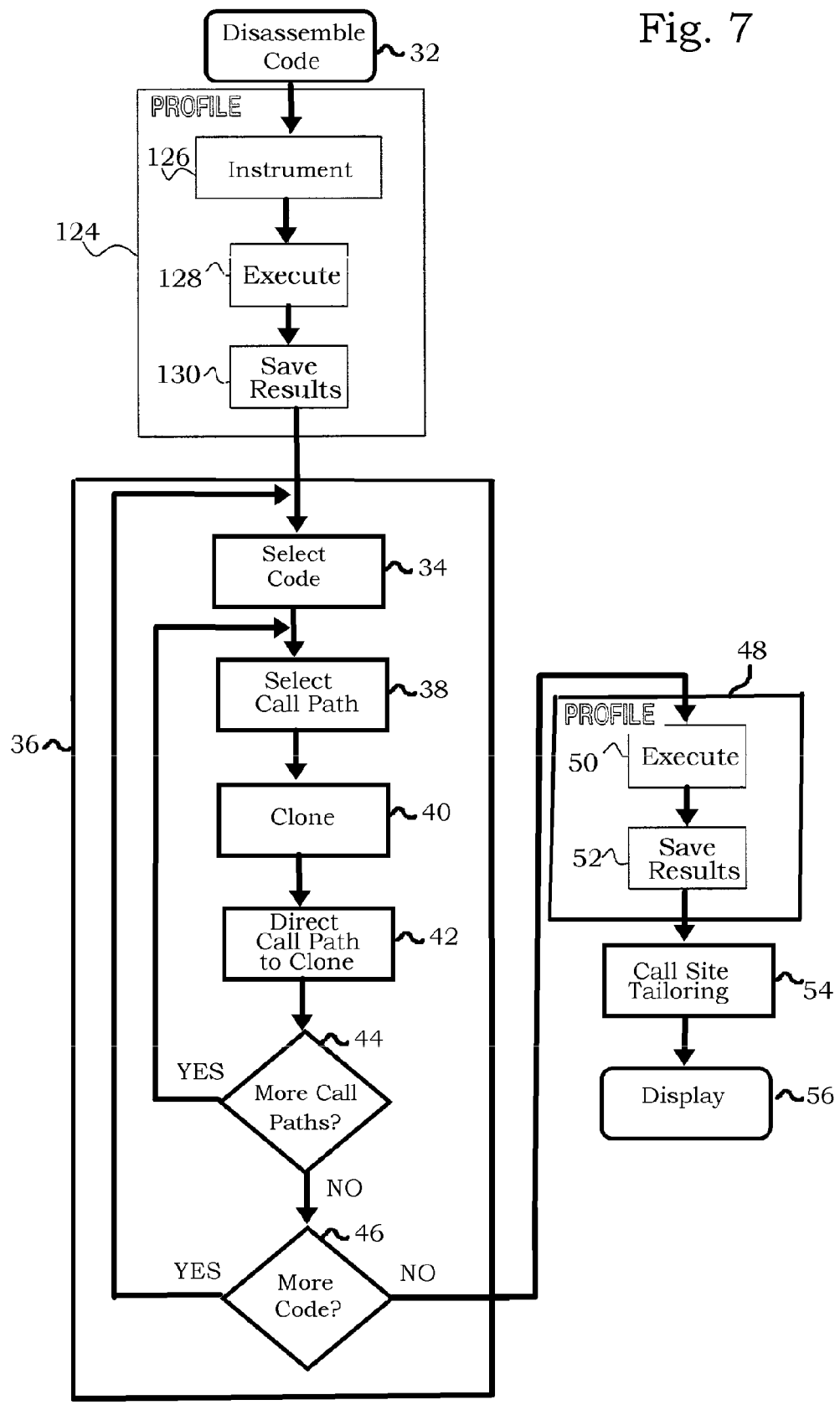
FIG. 7 is a high-level flow chart of a method for gathering profile information from computer program code that includes a pre-profiling step, in accordance with an alternate embodiment of the invention.

Reference is now made to FIG. 7, which is a high-level flow chart of a method for preliminarily gathering profile information from computer program code in accordance with an alternate embodiment of the invention, referred to as "preprofiling". Initial step 32 is carried out as described above with reference to FIG. 2. Pre-profiling is represented by block 124.

Pre-profiling begins at step 126 in block 124. A description of an exemplary instrumentation approach follows. However, step 126 may be carried out using any suitable conventional profiling method, including sampling, so long as hot and cold code can be identified, and which meet predefined criteria. For example, code may be characterized as hot if its execution frequency in step 126 exceeds a predefined heat threshold, and as cold if it fails to meet criteria for hot code. Typically, the heat threshold is an average, calculated as the sum of all the instruction executions (as collected during profiling) divided by the number of all the instructions in the program. For example if the total number of executed instructions was 10,000 and there is a total of 10 instructions in the program, then the heat threshold is: 10,000/10=1,000. Any instruction that was executed more than 1000 times is considered to be hot.

Each basic block is modified so that each time the program execution passes through the block a counter is incremented. In one instrumentation approach, additional code, termed instrumentation code, is added to the beginning of each basic block. This code performs a CALL jump to a universal stub function. The universal stub function makes use of the return address argument passed by the CALL instruction to identify from which basic block it was called. The counter for that basic block is incremented each time the universal stub is called from within that block during the profiling run. The universal stub function then returns execution to the calling basic block.

A second method of instrumentation, useful on platforms where no CALL instruction exists, comprises overriding the last instruction of each basic block with a JUMP instruction to a designated code area that is appended to the end of the original code section. In that area, the counter associated with the basic block is incremented. The overwritten last instruction that was taken from the original basic block is executed in the appended area, thus maintaining the original program semantics. Using this method, the original code section size is kept intact, and most of the code is unaltered (except the overwritten last instructions of the basic blocks, which in most cases are control-transferring instructions).

The instrumented program is run at step 128. On profiling run termination, the information is retrieved from the counters and written to a log file at step 130.

For each hot function, optimizer 28 (FIG. 1) now performs further analysis in block 36. At step 34, hot code is selected. The selected code is typically a hot function identified in initial step 32, but may also be a block of executable code. Cold code is ignored. It should be noted that cold code is not necessarily limited to functions, but can be any block of infrequently executed code to include function calls in the block.

Having selected a function, control proceeds to step 38 and to its successors, which are performed as in the embodiment of FIG. 2, details of which are not repeated.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. A computer-implemented method of program optimization, comprising the steps of:
   disassembling an entire code section of post-linked executable program code;
   pre-profiling said disassembled program code to identify hot portions thereof, said hot portions having a first frequency of execution that exceeds a first predefined threshold, and to identify a function in said hot portions;
   identifying potential call sites to said function in said hot portions of said disassembled entire code section;

dissecting said disassembled entire code section to identify control flow properties and edge profile data therein;

responsively to said control flow properties and said edge profile data, identifying call paths comprising chains of function calls leading to said call sites, wherein said chains include cyclic paths indicative of recursive function calls from one function to another function within respective chains, and wherein said call paths have a second frequency of execution that exceeds a second predefined threshold;

cloning chains of functions corresponding to the chains of function calls in the call paths said function to create a modified program code having a plurality of cloned instances of said function therein, wherein cloning comprises replacing said cyclic paths within the chains of function calls by new paths comprising chains of inlined function calls, said new paths including an inlined call from the one function to the other function;

redirecting said call paths of said modified program code to said call sites of respective cloned instances of said function;

executing said modified program code while accumulating respective new clone-specific profile data for said redirected call paths therein; and optimizing said modified program code responsively to said clone-specific profile data.

2. The method according to claim 1, further comprising the steps of:
generating a call graph of functions in said program code;
removing cyclic paths from said call graph;
rearranging said call graph to form a topologically sorted call graph; and
using said sorted call graph to identify said call paths.

3. The method according to claim 1, wherein said step of optimizing said modified program code comprises the steps of:
distributing said call paths of said function in said modified program code to assign a respective modified call path to each of said instances of said function;
determining that said instances of said function in said modified program code meet predefined cloning criteria;
responsively to said step of determining, selecting a first instance of said function and a second instance of said function, wherein said first instance of said function and said second instance of said function lack recursive calls to others of said instances of said function;
redirecting said modified call path of said first instance of said function to lead to said second instance of said function; and
excluding said first instance of said function from said modified program code.

4. The method according to claim 3, wherein said cloning criteria comprise a profile overlap of said instances of said function that exceeds a predetermined threshold.

5. The method according to claim 1, wherein said function has a call depth, and said step of cloning chains of functions is performed only if said call depth is less than a predetermined value.

6. The method according to claim 1, wherein said clone-specific profile data comprises hardware events that include at least one of the group consisting of a cache miss, a cycle tick, a TLB (translation lookaside buffer) miss, IPC (instructions executed per cycle) event, and a pipeline stall.

7. The method according to claim 1, further comprising the steps of:
combining said clone-specific profile data corresponding to selected ones of said instances of said function to produce class results; and
displaying said class results.

8. A computer software product for program optimization, including a tangible non-transitory computer-readable medium in which computer program instructions are stored, which instructions, when read by a computer, cause the computer to:
disassemble an entire code section of post-linked executable program code;
pre-profile said disassembled program code to identify hot portions thereof, said hot portions having a first frequency of execution that exceeds a first predefined threshold;
identify a function in said hot portions;
identify potential call sites to said function in said hot portions of said disassembled entire code section;
dissect said disassembled entire code section to identify control flow properties and edge profile data therein;
responsively to said control flow properties and said edge profile data, identify call paths comprising chains of function calls leading to said call sites, wherein said chains include cyclic paths indicative of recursive function calls from one function to another function within respective chains, and wherein said call paths have a second frequency of execution that exceeds a second predefined threshold;
clone chains of functions corresponding to the chains of function calls in the call paths said function to create a modified program code having a plurality of cloned instances of said function therein, wherein cloning comprises replacing said cyclic paths within the chains of function calls by new paths comprising chains of inlined function calls, said new paths including an inlined call from the one function to the other function;
redirect said call paths of said modified program code to said call sites of respective cloned instances of said function;
execute said modified program code to accumulate respective new clone-specific profile data for said instances of said function; and
optimize said modified program code responsively to said clone-specific profile data.

9. The computer software product according to claim 8, wherein said computer is further instructed to generate a call graph of functions in said program code, remove cyclic paths from said call graph, rearrange said call graph to form a topologically sorted call graph, and use said sorted call graph to identify said call paths.

10. The computer software product according to claim 8, wherein said computer is further instructed to optimize said modified program code by making a determination that said instances of said function in said modified program code have a profile overlap that exceeds a predetermined threshold, and responsively to said determination, select a first instance of said function and a second instance of said function, wherein said first instance of said function and said second instance of said function lack recursive calls to others of said instances of said function, redirect said call path of said first instance of said function to lead to said second instance of said function, and exclude said first instance of said function from said modified program code.

11. The computer software product according to claim 8, wherein said function has a call depth, and wherein said computer is further instructed to clone said function only if said call depth is less than a predetermined value.

12. The computer software product according to claim 8, wherein said clone-specific profile data comprises hardware events that include at least one of the group consisting of a cache miss, a cycle tick, a TLB (translation lookaside buffer) miss, IPC (instructions executed per cycle) event, and a pipeline stall.

13. A data processing system for program optimization, comprising:
- a computer processor; and
- a memory accessible by said computer processor and having objects instantiated therein, said objects being executable by said computer processor and comprising an optimizer and a profiler, said optimizer operative to:
- disassemble an entire code section of post-linked executable program code;
- pre-profile said disassembled program code to identify hot portions thereof, said hot portions having a first frequency of execution that exceeds a first predefined threshold;
- identify a function in said hot portions;
- identify potential call sites to said function in said hot portions of said disassembled entire code section;
- dissect said disassembled entire code section to identify control flow properties and edge profile data therein;
- responsively to said control flow properties and said edge profile data, identify call paths comprising chains of function calls leading to said call sites, wherein said chains include cyclic paths indicative of recursive function calls from one function to another function within respective chains, and wherein said call paths have a second frequency of execution that exceeds a second predefined threshold;
- clone chains of functions corresponding to the chains of function calls in the call paths said function to create a modified program code having a plurality of cloned instances of said function therein, wherein cloning comprises replacing said cyclic paths within the chains of function calls by new paths comprising chains of inlined function calls, said new paths including an inlined call from the one function to the other function;
- redirect said call paths of said modified program code to said call sites of respective cloned instances of said function;
- execute said modified program code to accumulate respective new clone-specific profile data for said instances of said function; and
- optimize said modified program code responsively to said clone-specific profile data.

14. The data processing system according to claim 13, wherein said optimizer is operative on said modified program code to make a determination that said instances of said function in said modified program code have a profile overlap that exceeds a predetermined threshold, and responsively to said determination, select a first instance of said function and a second instance of said function, wherein said first instance of said function and said second instance of said function lack recursive calls to others of said instances of said function, redirect said call path of said first instance of said function to lead to said second instance of said function, and exclude said first instance of said function from said modified program code.

15. The data processing system according to claim 13, wherein said function has a call depth, and wherein said optimizer is operative to clone said function only if said call depth is less than a predetermined value.

* * * * *